United States Patent
Yoshikawa et al.

(10) Patent No.: US 11,014,458 B2
(45) Date of Patent: May 25, 2021

(54) DIE-CAST ALUMINUM BRACKET

(71) Applicants: TOYOTA JIDOSHA KABUSHIKI KAISHA, Toyota (JP); CHUO MALLEABLE IRON CO., LTD., Nagoya (JP)

(72) Inventors: Shigetaka Yoshikawa, Miyoshi (JP); Akira Watanabe, Nagoya (JP); Ryo Kawauchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/456,144

(22) Filed: Jun. 28, 2019

(65) Prior Publication Data

US 2020/0009971 A1 Jan. 9, 2020

(30) Foreign Application Priority Data

Jul. 9, 2018 (JP) .............................. JP2018-129678

(51) Int. Cl.
*B60L 50/71* (2019.01)
*B21D 53/88* (2006.01)

(52) U.S. Cl.
CPC .............. *B60L 50/71* (2019.02); *B21D 53/88* (2013.01)

(58) Field of Classification Search
CPC .. B60L 50/71; B60L 2240/545; B60L 3/0007; B60L 50/72; B60L 58/33; B21D 53/88; B22D 25/02; B62D 27/065; B62D 29/008; B62D 21/11; B62D 21/155; B62D 25/082; B60K 15/07; B60K 2015/0634

USPC ............................... 248/205.1; 280/781, 788
See application file for complete search history.

(56) References Cited

U.S. PATENT DOCUMENTS

| | | | | |
|---|---|---|---|---|
| 1,371,622 A * | 3/1921 | Hudson | ..................... | B60K 5/12 248/675 |
| 1,635,847 A * | 7/1927 | Hooper | ..................... | B60K 5/12 248/675 |
| 3,154,704 A * | 10/1964 | Shaffer | ..................... | H02K 5/24 310/51 |
| 5,593,001 A * | 1/1997 | Takano | ..................... | F16F 1/44 180/312 |
| 6,547,478 B1 * | 4/2003 | Lin | ..................... | A47B 96/061 248/200 |
| 8,226,061 B2 * | 7/2012 | Nehls | ..................... | F24S 25/33 248/300 |
| 8,567,650 B2 * | 10/2013 | Read | ..................... | B60R 9/065 224/404 |

(Continued)

FOREIGN PATENT DOCUMENTS

JP 2017074819 A 4/2017

*Primary Examiner* — Muhammad Ijaz
(74) *Attorney, Agent, or Firm* — Dickinson Wright PLLC (57) ABSTRACT

A die-cast aluminum bracket for a vehicle is provided between a mounted object and a vehicle structure. The die-cast aluminum bracket includes: a first attachment section configured to be coupled to the mounted object; and a second attachment section configured to be coupled to the vehicle structure, wherein a first surface, which faces the mounted object at the time when the mounted object is coupled, in the first attachment section has a chill layer removed section in which an internal layer of the bracket is exposed, and a second surface of the first attachment section has a chill layer, the second surface being on an opposite side of the first attachment section from the first surface.

4 Claims, 8 Drawing Sheets

(56) References Cited

U.S. PATENT DOCUMENTS

| | | | |
|---|---|---|---|
| D702,620 S * | 4/2014 | Read | D12/223 |
| 2010/0148027 A1* | 6/2010 | Lenk | G01D 11/30 |
| | | | 248/309.1 |
| 2017/0101031 A1 | 4/2017 | Ohashi | |
| 2018/0030581 A1* | 2/2018 | Michiyama | C22F 1/04 |
| 2020/0009971 A1* | 1/2020 | Yoshikawa | B60L 58/33 |

* cited by examiner

DIE-CAST ALUMINUM BRACKET

INCORPORATION BY REFERENCE

The disclosure of Japanese Patent Application No. 2018-129678 filed on Jul. 9, 2018 including the specification, drawings and abstract is incorporated herein by reference in its entirety.

BACKGROUND

1. Technical Field

The present disclosure relates to a die-cast aluminum bracket.

2. Description of Related Art

For example, a mounting structure for a vehicle provided between an assembly frame, on which a fuel cell is mounted, and a body of a fuel cell vehicle is disclosed in Japanese Patent Application Publication No. 2017-074819 (JP 2017-074819 A).

SUMMARY

There is a case where this type of the mounting structure is required to have a function of being fractured at the time when a large load is applied thereto so that an intended break mode in design is achieved during a collision of the vehicle. Meanwhile, this type of the mounting structure is also required to have a function of securing strength against vibrations that are applied thereto in a normal time. Thus, a mounting structure having both of these functions is desired.

A die-cast aluminum bracket according to an aspect of the present disclosure is a bracket for a vehicle provided between a mounted object and a vehicle structure. The die-cast aluminum bracket includes: a first attachment section configured to be coupled to the mounted object; and a second attachment section configured to be coupled to the vehicle structure, wherein a first surface, which faces the mounted object at the time when the mounted object is coupled, in the first attachment section has a chill layer removed section in which an internal layer of the bracket is exposed, and a second surface of the first attachment section has a chill layer, the second surface being on an opposite side of the first attachment section from the first surface.

According to the above aspect, while strength against a vibration, which is transmitted to the die-cast aluminum bracket in a normal time, is secured by the chill layer, the die-cast aluminum bracket is likely to be fractured from the chill layer removed section at the time when a large load is applied to the die-cast aluminum bracket during a collision of the vehicle. Therefore, an intended break mode in design can be realized.

In the above aspect, an area of the chill layer on the second surface may be larger than an area of the chill layer on the first surface. Furthermore, in the above aspect, when the first surface and the second surface are seen in a perpendicular direction to the first surface, an area of the chill layer on the second surface may be larger than an area of the chill layer on the first surface.

According to the above configuration, when the large load is applied to the die-cast aluminum bracket during the collision of the vehicle, the die-cast aluminum bracket is likely to be fractured from the surface having the smaller area of the chill layer.

In the above aspect, an attachment hole may be provided in the first attachment section, the attachment hole being configured to be fitted with a bolt coupling the mounted object and the first surface, and the chill layer removed section may be provided in such a manner as to surround an outer circumference of the attachment hole.

According to the above configuration, tensile strength of the first attachment section around the attachment hole having low rigidity can be reduced. Thus, when the large load is applied to the die-cast aluminum bracket during the collision of the vehicle, the die-cast aluminum bracket is likely to be fractured from the first attachment section.

The disclosure can also be realized in various modes other than the die-cast aluminum bracket for the vehicle. For example, the disclosure can be realized in modes of a vehicle mount structure and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
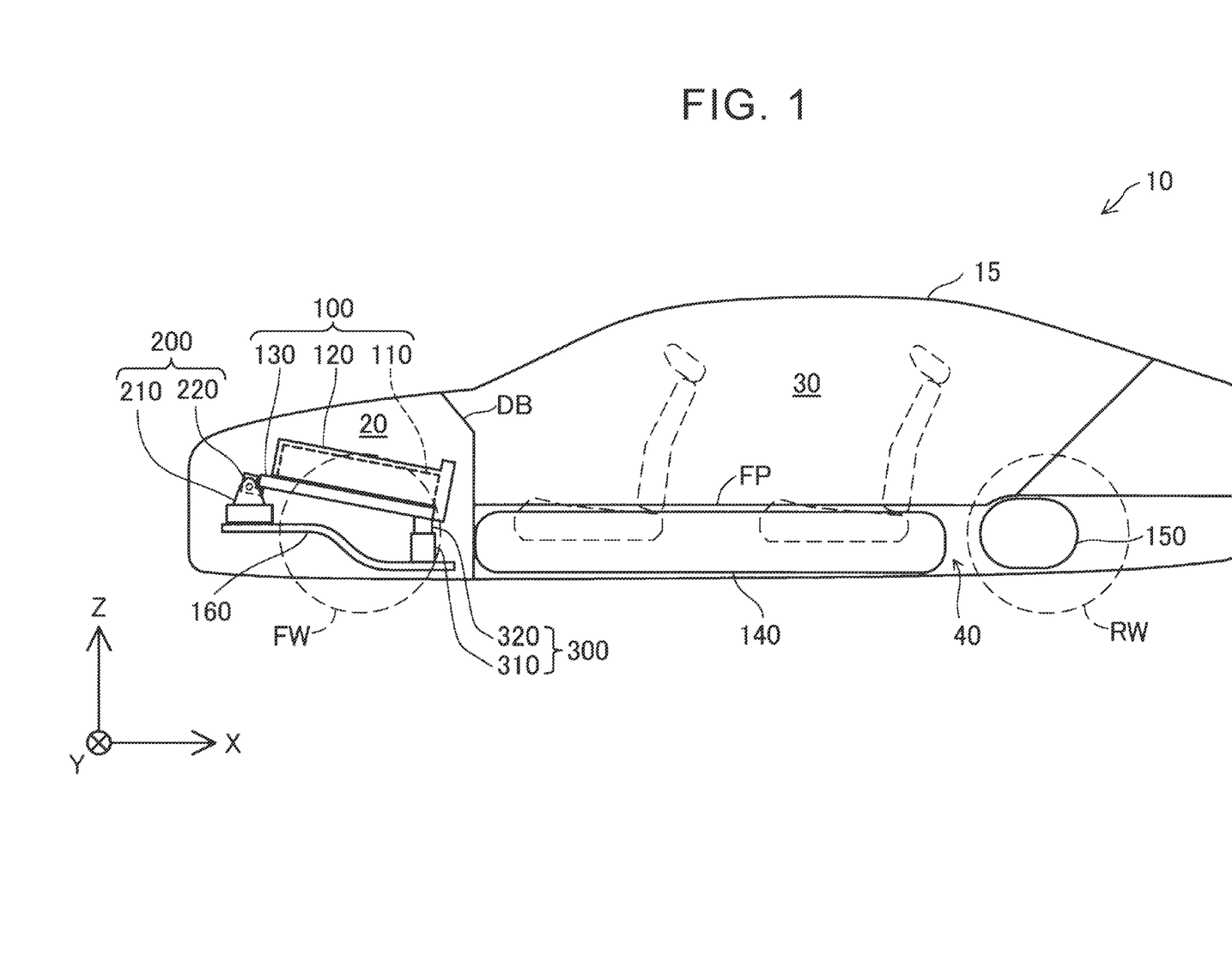
FIG. 1 is an explanatory view of a schematic configuration of a fuel cell vehicle.

FIG. 1 is an explanatory view of a schematic configuration of a vehicle 10, on which a die-cast aluminum bracket for a vehicle according to a first embodiment is mounted. FIG. 1 shows three directions X, Y, Z that are perpendicular to each other. The X-direction is a longitudinal direction of the vehicle 10, the Y-direction is a width direction of the vehicle 10, and the Z-direction is an up-down direction of the vehicle 10. The other drawings also show these directions when necessary. The vehicle 10 in this embodiment is a fuel cell vehicle. The vehicle 10 may be a gasoline vehicle, may be a diesel vehicle, may be a hybrid vehicle, or may be an electric vehicle.

The vehicle 10 includes a body 15, front wheels FW, and rear wheels RW. Two each of the front wheels FW and the rear wheels RW are provided on right and left sides. The body 15 includes a front compartment 20, a cabin 30, and an underfloor compartment 40. The front compartment 20 is separated from the cabin 30 and the underfloor compartment 40 by a dashboard DB. The cabin 30 is separated from the underfloor compartment 40 by a floor panel FP.

In the front compartment 20, a fuel cell module 100 including a fuel cell 110 as a power source of the fuel cell vehicle is provided. The cabin 30 serves as a space where a driver and the like of the vehicle 10 get on. In the underfloor compartment 40, a hydrogen tank 140 storing hydrogen gas to be used for power generation of the fuel cell 110 is provided. A drive motor 150 is provided between the right and left rear wheels RW. The drive motor 150 is supplied with the electric power from the fuel cell 110 and thereby generates drive power. The drive power generated by the drive motor 150 is transmitted to the rear wheels RW via an unillustrated driveshaft, and drives the vehicle 10. Note that the vehicle 10 may adopt a front-wheel-drive layout. The drive motor 150 may be configured as an in-wheel motor that is incorporated into the rear wheels RW (or the front wheels FW).

The fuel cell module 100 includes the fuel cell 110, a stack case 120, and a support frame 130. In the box-shaped stack case 120, the fuel cell 110 is accommodated with a booster converter for the fuel cell 110, and the like. A lower surface of the stack case 120 is supported by the support frame 130. In order to support the stack case 120 that accommodates the fuel cell 110 with relatively heavy weight and the like, the support frame 130 is highly rigid. The support frame 130 is tilted with respect to a horizontal direction so that a rear end of the support frame 130 is located on a lower side than a front end of the support frame 130.

A front mounting section 200 is provided near the front end of the support frame 130. The front end of the support frame 130 is supported by the front mounting section 200. A rear mounting section 300 is provided near the rear end of the support frame 130. The rear end of the support frame 130 is supported by the rear mounting section 300. The front mounting section 200 and the rear mounting section 300 will be described in detail later (see FIG. 2 and FIG. 3).

In the front compartment 20, a suspension member 160 is provided on each of the right and left sides of the vehicle 10. Each of the suspension members 160 is a member that constitutes a part of the body 15. Each of the suspension members 160 extends in the longitudinal direction. The suspension member 160 has a bent shape so that a rear end of the suspension member 160 is located on the lower side than a front end of the suspension member 160. The front mounting section 200 is coupled to a portion near the front end of the suspension member 160 located on the upper side. The rear mounting section 300 is coupled to a portion near the rear end of the suspension member 160 located on the lower side.

Figure 2:
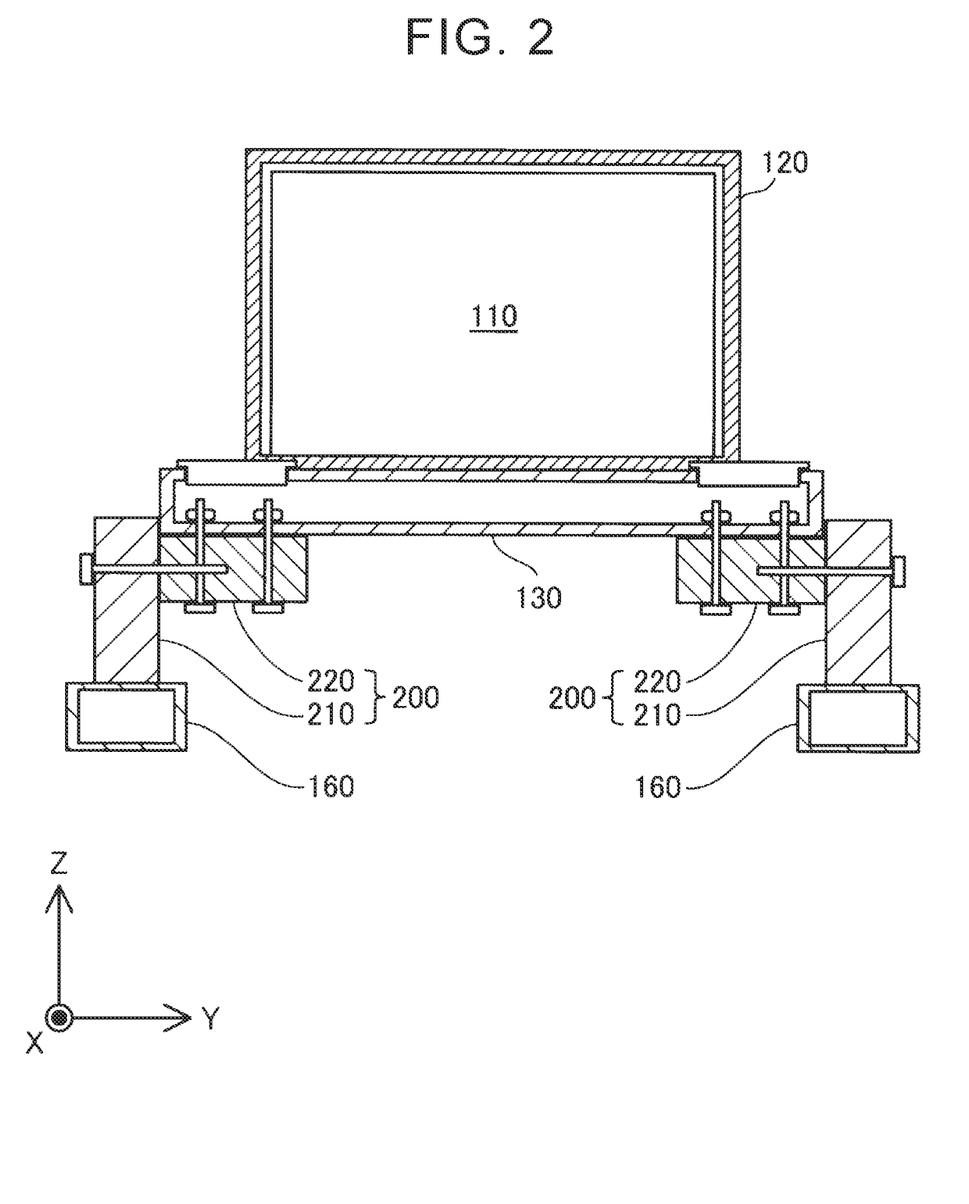
FIG. 2 is a schematic cross-sectional view of a schematic configuration of a front mounting section.

FIG. 2 is a schematic cross-sectional view of a schematic configuration of the front mounting section 200 in this embodiment. The vehicle 10 includes a pair of the front mounting sections 200, and each of the front mounting sections 200 is provided on the right side and the left side of the vehicle 10. Each of the front mounting sections 200 includes a front mount body 210 and a front bracket 220. A lower portion of the front mount body 210 is coupled to the suspension member 160. An upper portion of the front mount body 210 is coupled to the support frame 130 via the front bracket 220. The suspension member 160, the front mount body 210, the front bracket 220, and the support frame 130 are coupled to each other by bolts.

The front mount body 210 has such a structure that an elastic member such as rubber is accommodated in a metal casing made of steel, an aluminum alloy, or the like, for example. A viscous fluid may be enclosed in the elastic member. The front mount body 210 has a function of supporting the support frame 130 via the front bracket 220, and also has a function of suppressing transmission of a vibration from the suspension member 160 to the support frame 130.

The front bracket 220 is a bracket that couples the support frame 130 and the front mount body 210. The front bracket 220 is formed of the metal such as steel or the aluminum alloy, for example.

Figure 3:
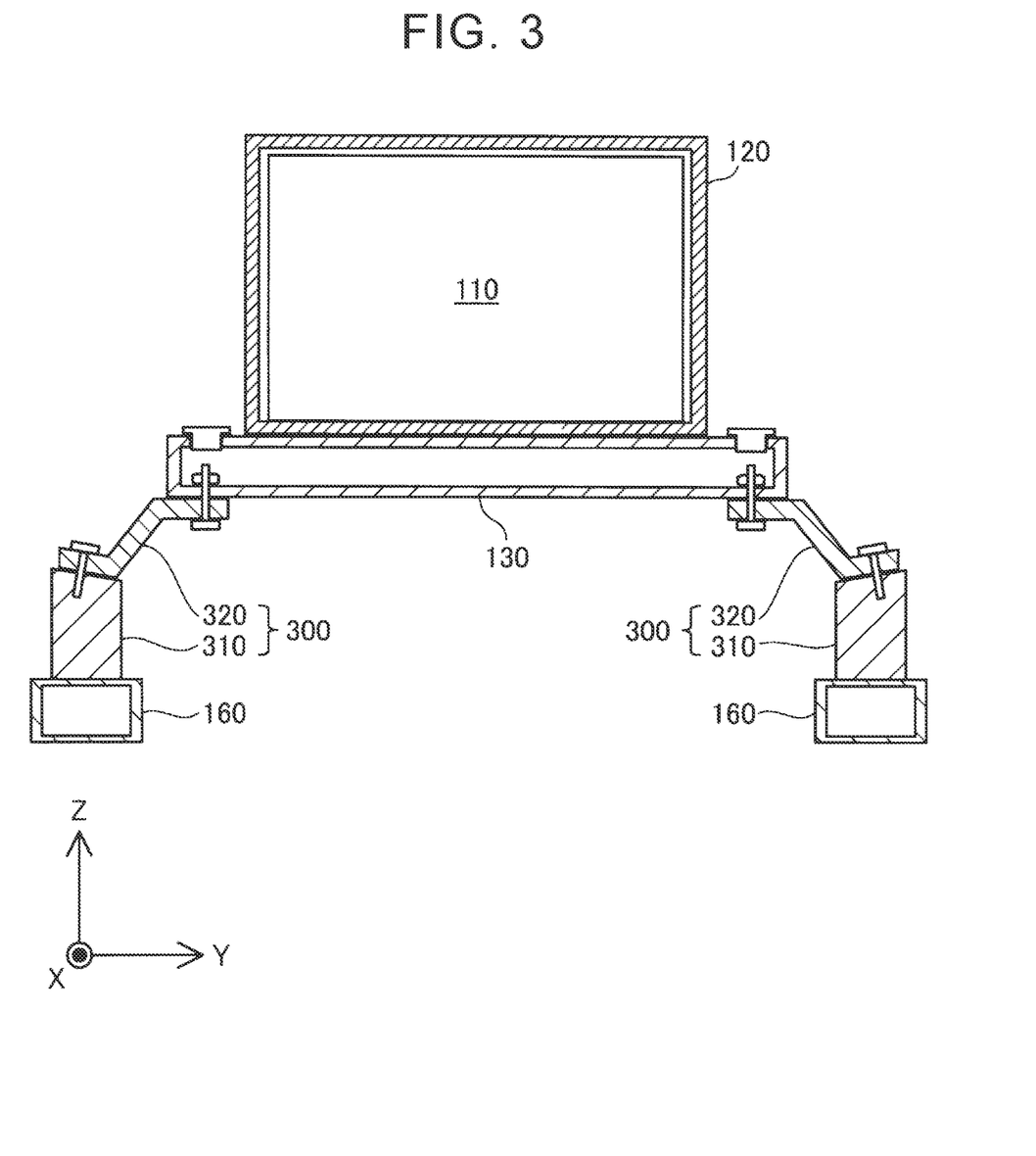
FIG. 3 is a schematic cross-sectional view of a schematic configuration of a rear mounting section.

FIG. 3 is a schematic cross-sectional view of a schematic configuration of the rear mounting section 300 in this embodiment. The vehicle 10 includes a pair of the rear mounting sections 300, and each of the rear mounting sections 300 is provided on the right side and the left side of the vehicle 10. Each of the rear mounting sections 300 includes a rear mount body 310 and a rear bracket 320. A lower portion of the rear mount body 310 is coupled to the suspension member 160. An upper portion of the rear mount body 310 is coupled to the support frame 130 via the rear bracket 320. The suspension member 160, the rear mount body 310, the rear bracket 320, and the support frame 130 are coupled to each other by bolts.

The rear mount body 310 has such a structure that an elastic member such as rubber is accommodated in a metal casing made of steel, the aluminum alloy, or the like, for example. The viscous fluid may be enclosed in the elastic member. The rear mount body 310 has a function of supporting the support frame 130 via the rear bracket 320, and also has a function of suppressing the transmission of the vibration from the suspension member 160 to the support frame 130.

Figure 4:
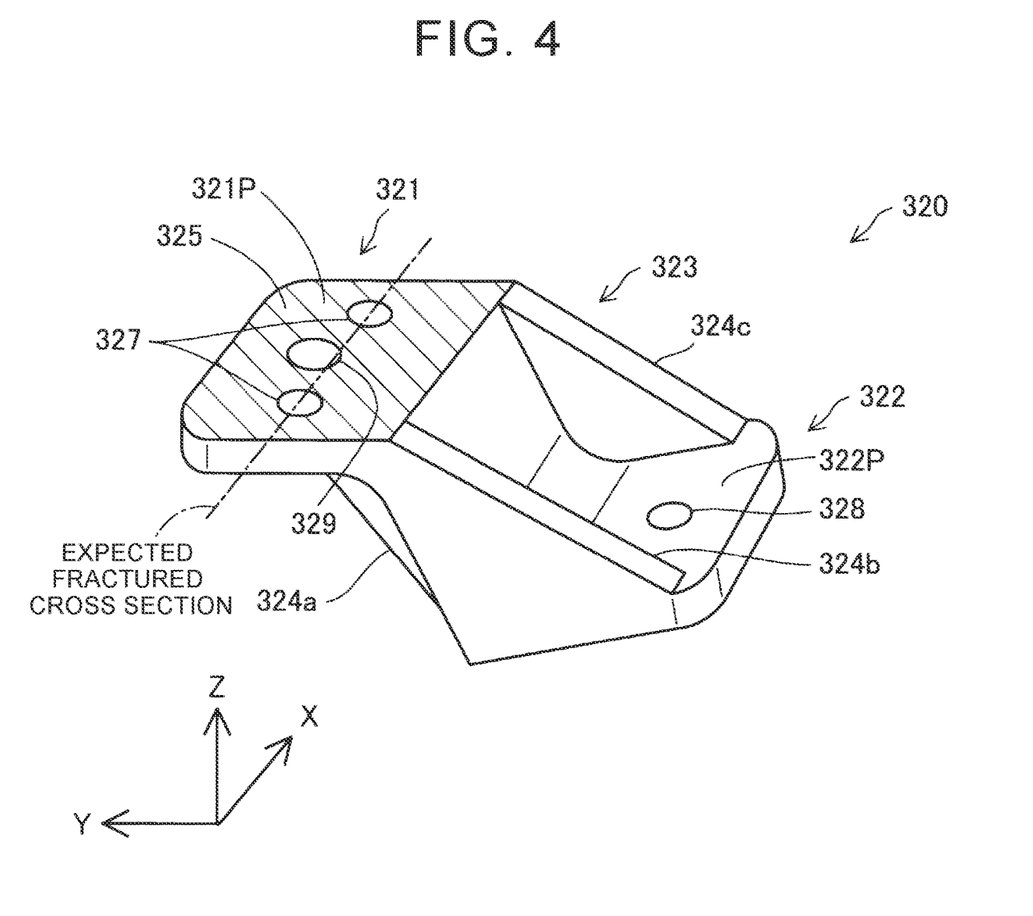
FIG. 4 is an explanatory view of a shape of a rear bracket.

FIG. 4 is a perspective view of a shape of the rear bracket 320 in this embodiment. In this embodiment, the rear bracket 320, which is provided on each of the right and left sides of the vehicle 10, has a bilaterally-symmetric shape. Note that the rear bracket 320, which is provided on each of the right and left sides of the vehicle 10, may not have the bilaterally-symmetric shape. As a representative example, FIG. 4 shows the left rear bracket 320 in the vehicle 10. The rear bracket 320 is a die-cast aluminum bracket provided between a mounted object and a vehicle structure. In the present specification, the "mounted object" means any type of the mounted object on the vehicle 10, and examples of the "mounted object" are the fuel cell module 100, the drive motor 150, and the other types of electronic equipment. It is needless to say that, in the case where the vehicle 10 is the gasoline vehicle or the like, the "mounted objects" include an engine and engine auxiliary machines. The "vehicle structure" means a general structure that constitutes the vehicle 10, and examples of the "vehicle structure" are the body 15 and a chassis.

The rear bracket 320 in this embodiment is a bracket used to couple the support frame 130 for the fuel cell module 100 as the mounted object and the rear mount body 310 as the vehicle structure. The rear bracket 320 in this embodiment includes a first attachment section 321 and a second attachment section 322.

The first attachment section 321 has a first plate-like portion 321P that has a flat plate shape and is coupled to the support frame 130 for the fuel cell module 100 as the mounted object. The first plate-like portion 321P is formed with two first attachment holes 327, to each of which a bolt is fastened for coupling with the support frame 130. The number of the first attachment hole 327 may be one, or may be three or more. In addition, the first plate-like portion 321P is formed with a punched hole 329 between the two first attachment holes 327. The punched hole 329 is a hole that is provided for purposes of reducing weight of the rear bracket 320 and securing desired sectional rigidity thereof, for example. The first plate-like portion 321P may not be formed with the punched hole 329. An upper surface of the first attachment section 321 is shaped to be flat so as to follow a lower surface of the support frame 130.

The second attachment section 322 has a second plate-like portion 322P that has a flat plate shape and is coupled to the suspension member 160 in the body 15 via the rear mount body 310. The second plate-like portion 322P is formed with a second attachment hole 328 to which a bolt is fastened for coupling with the rear mount body 310. The second attachment section 322 is provided on an outer side from the first attachment section 321 in the width direction (the Y-direction) of the vehicle 10. In addition, the second attachment section 322 is provided on the lower side than the first attachment section 321. A lower surface of the second attachment section 322 is shaped to follow an upper surface of the rear mount body 310, which is tilted such that the upper surface thereof is oriented inward. Accordingly, a right and left pair of the rear brackets 320 that are coupled to the support frame 130 is unlikely to be displaced in a right-left direction on a right and left pair of the rear mount bodies 310.

A body section 323 is provided between the first attachment section 321 and the second attachment section 322. The body section 323 has a plate shape. The body section 323 supports the first attachment section 321 at an upper position than the second attachment section 322. The body section 323 is tilted with respect to a vertical direction. An upper end portion of the body section 323 is connected to an outer end portion of the first attachment section 321 in the width direction (the Y-direction) of the vehicle 10. A lower end portion of the body section 323 is connected to an inner end portion of the second attachment section 322 in the width direction (the Y-direction) of the vehicle 10. Accordingly, the first attachment section 321 has a shape that is projected inward in the width direction (the Y-direction) of the vehicle 10 from the upper end portion of the body section 323, and the second attachment section 322 has a shape that is projected outward in the width direction (the Y-direction) of the vehicle 10 from the lower end portion of the body section 323.

In order to secure bending rigidity around an axis that is parallel to the longitudinal direction (the X-direction) of the vehicle 10, the rear bracket 320 in this embodiment is provided with a first rib 324a that couples a lower surface of the first attachment section 321 and the body section 323. The first rib 324a has a plate shape. The first rib 324a is provided near a center of the rear bracket 320 in the longitudinal direction (the X-direction) of the vehicle 10. The rear bracket 320 is further provided with a second rib 324b and a third rib 324c, each of which couples an upper surface of the second attachment section 322 and the body section 323. Each of the second rib 324b and the third rib 324c has a plate shape. The second rib 324b is provided in a front end portion of the rear bracket 320 in the longitudinal direction (the X-direction) of the vehicle 10. The third rib 324c is provided in a rear end portion of the rear bracket 320 in the longitudinal direction (the X-direction) of the vehicle 10.

In the rear bracket 320 of this embodiment, the first plate-like portion 321P, the body section 323, the second plate-like portion 322P, the first rib 324a, the second rib 324b, and the third rib 324c each have a thickness of approximately 10 to 15 mm. An outer surface of the rear bracket 320 in this embodiment is covered with a chill layer except for a chill layer removed section 325, which will be described later. The chill layer is formed as follows: when the molten aluminum alloy is poured into a mold in a manufacturing process of a die-cast aluminum product, the aluminum alloy is rapidly cooled by the mold, and a compact structure of the chill layer is formed on an outer surface of the die-cast aluminum product. Thus, the chill layer is harder than an internal layer. Although a thickness of the chill layer depends on manufacturing conditions such as a mold temperature, the thickness of the chill layer is approximately 0.5 mm herein. The chill layer has higher tensile strength and higher fatigue strength than the internal layer.

In the rear bracket 320 of this embodiment, a surface (the upper surface) of the first attachment section 321, which is located on a side facing the support frame 130 at the time when the support frame 130 for the fuel cell module 100 as the mounted object is coupled, has the chill layer removed section 325 where an internal material of the rear bracket 320 is exposed. The lower surface of the first attachment section 321 has the chill layer. In this embodiment, the chill layer removed section 325 is provided in an entire area of the upper surface of the first attachment section 321. Thus, the chill layer removed section 325 is provided in such a manner as to surround outer circumferences of the first attachment holes 327 on the upper surface of the first attachment section 321. The chill layer removed section 325 in this embodiment is formed by using a milling machine or the like to remove the chill layer on the upper surface of the first attachment section 321. It is possible to determine whether the surface has the chill layer or is the chill layer removed section 325 by performing the Vickers hardness test (JIS Z 2244) to compare a hardness thereof. This is because the chill layer has the more compact structure and thus is harder than the chill layer removed section 325. In the case where a test force is set at 10 kgf (98N), the Vickers hardness of the chill layer removed section 325 is 90 HV to 100 HV, and the Vickers hardness of the chill layer is 120 HV to 130 HV. That is, the Vickers hardness of the chill layer is 1.20 to 1.44 times higher than the Vickers hardness of the chill layer removed section 325.

Figure 5:
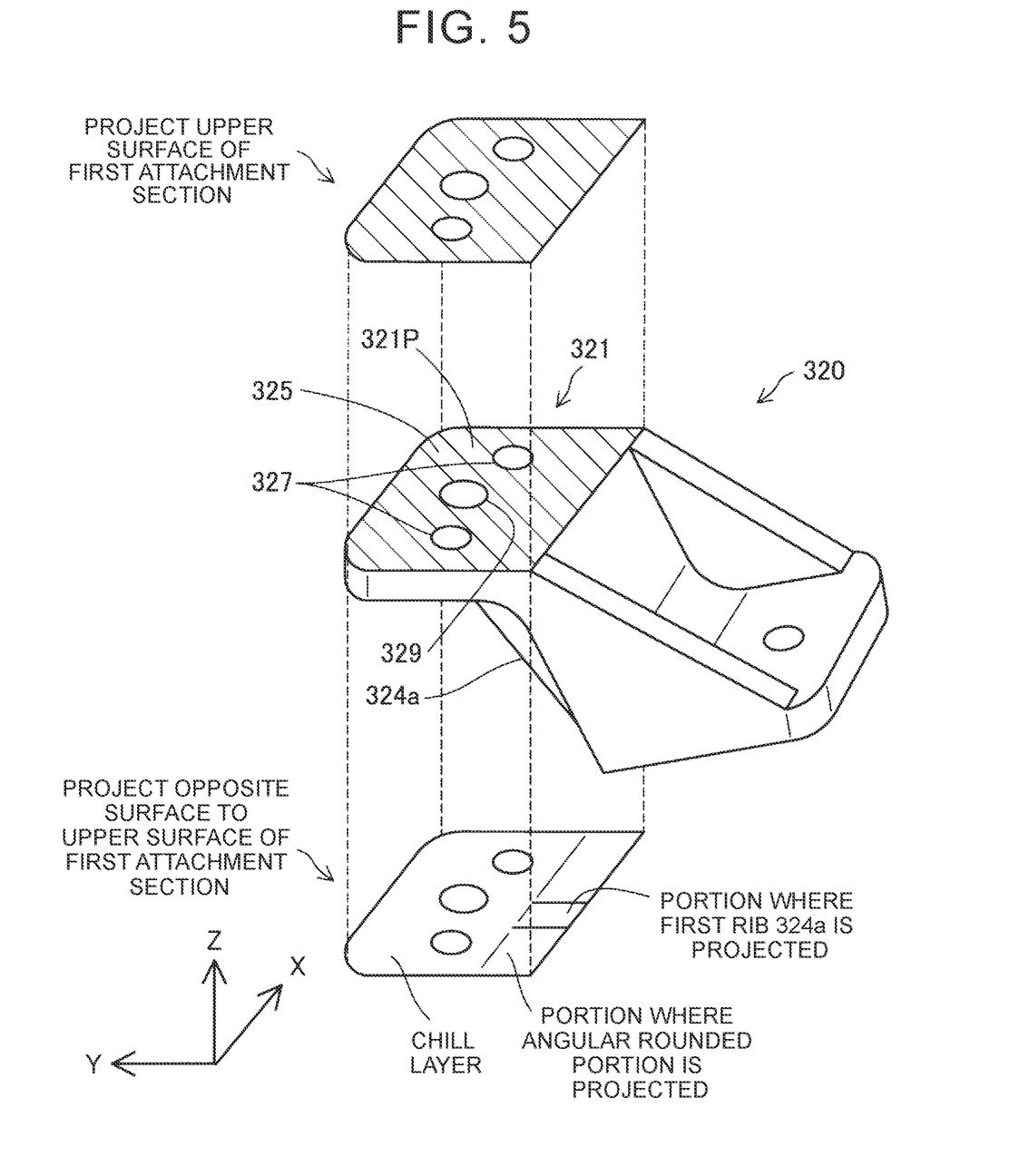
FIG. 5 is an explanatory view of an area of a projected chill layer.

FIG. 5 is an explanatory view of an area of the chill layer at the time when the upper surface of the first attachment section 321 and an opposite surface (the lower surface) to the upper surface of the first attachment section 321 in the rear bracket 320 are projected (seen) in a perpendicular direction to the upper surface of the first attachment section 321. Note that the projected lower surface of the first attachment section 321 includes: a portion where an angular rounded portion formed between the lower surface of the first attachment section 321 and the body section 323 is projected; and a portion where the first rib 324a is projected. In the rear bracket 320 of this embodiment, since the chill layer removed section 325 is formed in the entire area of the upper surface of the first attachment section 321, the upper surface of the first attachment section 321 does not have the chill layer. Meanwhile, the chill layer is formed in an entire area of the lower surface of the first attachment section 321. That is, the lower surface of the first attachment section 321 has the larger area of the chill layer than the upper surface of the first attachment section 321. Furthermore, when the upper surface of the first attachment section 321 and the lower surface of the first attachment section 321 are projected in the perpendicular direction to the upper surface of the first attachment section 321, the lower surface of the first attachment section 321 has the larger area of the chill layer than the upper surface of the first attachment section 321.

Figure 6:
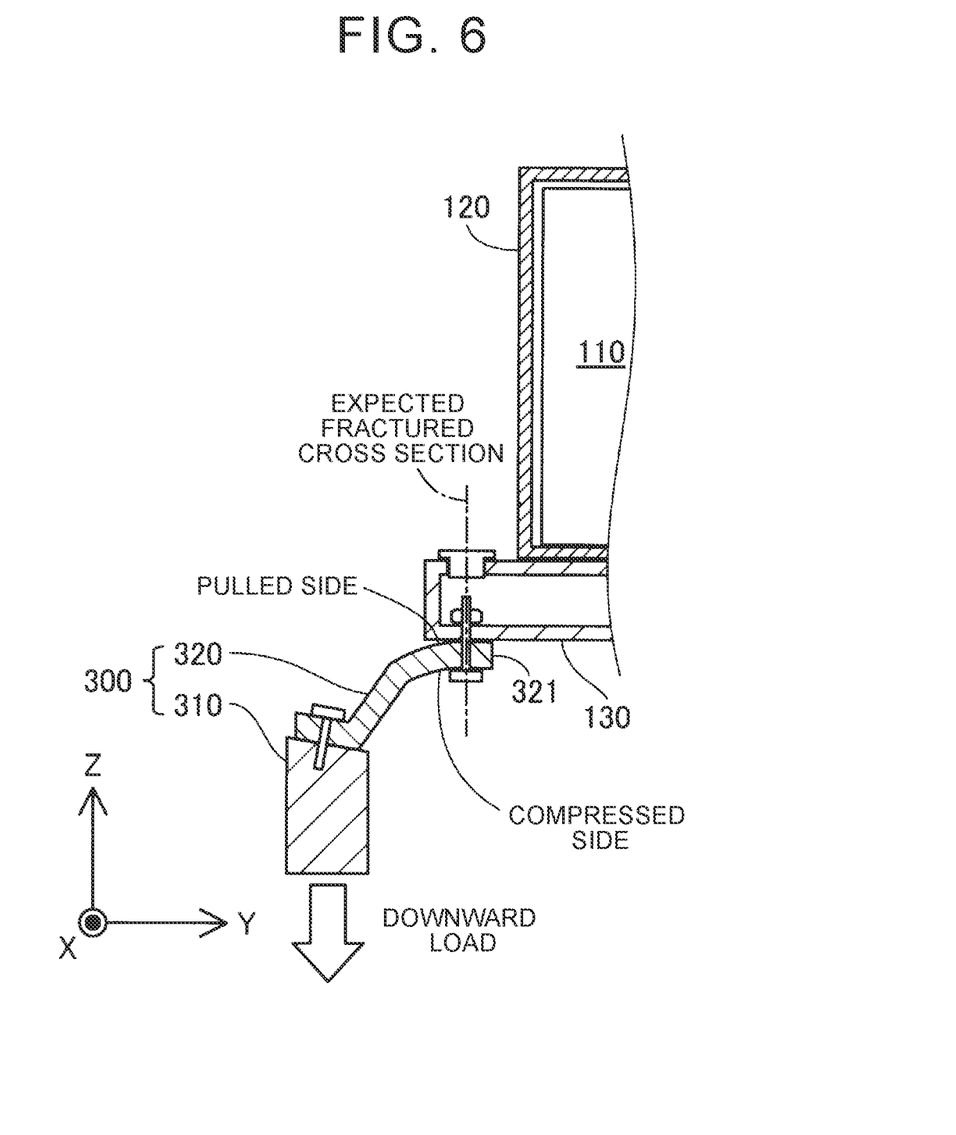
FIG. 6 is an explanatory view of a case where a large downward load is applied to the rear mounting section.

FIG. 6 is an explanatory view of a case where a large downward load (for example, of approximately 30 kN) is applied to the rear mounting section 300. For example, when the vehicle 10 is involved in a frontal collision, the rear mounting section 300 is pulled downward due to a deformation of the suspension member 160. In the case where the downward load is applied to the rear mounting section 300, the first attachment section 321 of the rear bracket 320 is bent in such a manner as to protrude upward in FIG. 6. As a result, tensile stress is applied to the upper surface of the first attachment section 321, and compressive stress is applied to the lower surface of the first attachment section 321. On the upper surface of the first attachment section 321, to which the tensile stress is applied, the chill layer removed section 325 having the lower tensile strength than the chill layer is provided. On the lower surface of the first attachment section 321, to which the compressive stress is applied, the chill layer is provided. Thus, the chill layer removed section 325 of the first attachment section 321 is likely to be fractured. For this reason, when the vehicle 10 is involved in the frontal collision, for example, the rear bracket 320 in this embodiment is fractured in a cross section including the first attachment holes 327 (an expected fractured cross section shown in FIG. 6).

Figure 7:
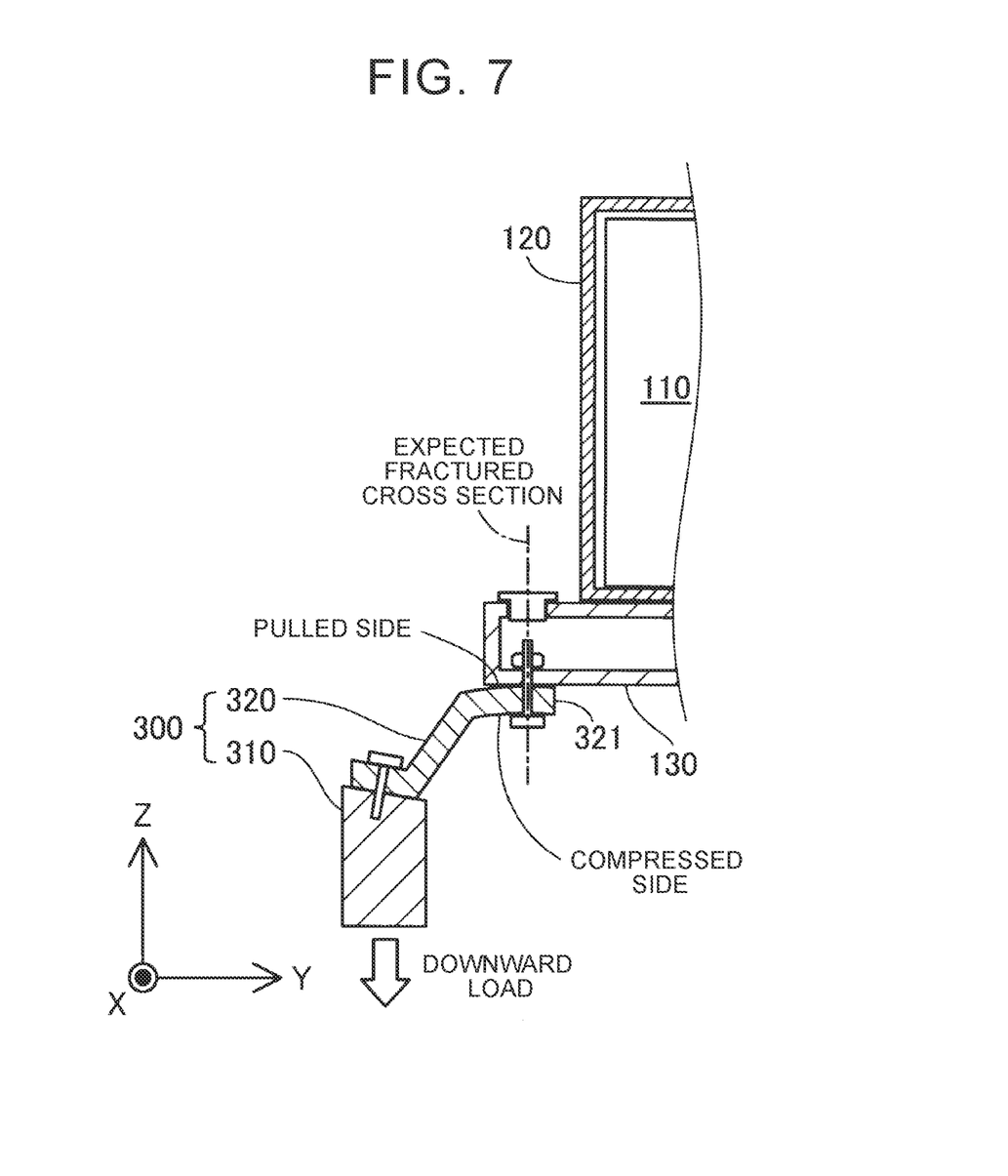
FIG. 7 is s an explanatory view of a case where the small downward load is applied to the rear mounting section.
Figure 8:
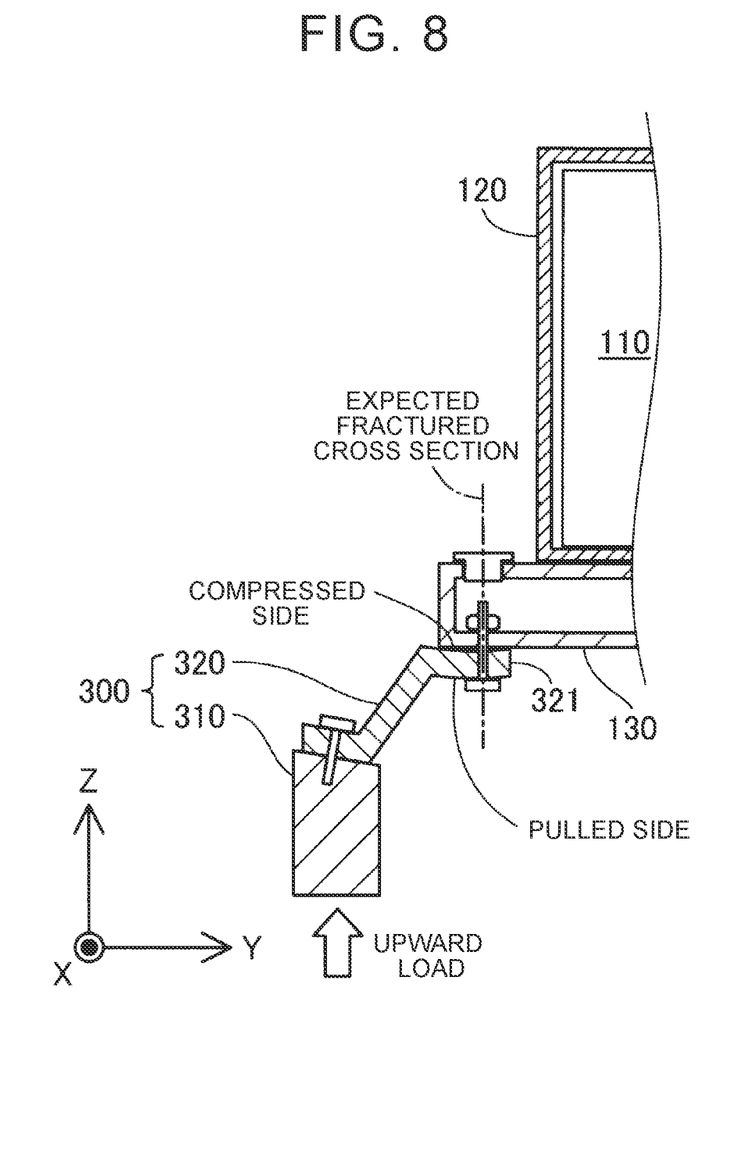
FIG. 8 is an explanatory view of a case where the small upward load is applied to the rear mounting section.

FIG. 7 is an explanatory view of a case where the small downward load (for example, of approximately 1 to 3 kN) is applied to the rear mounting section 300. FIG. 8 is an explanatory view of a case where a small upward load (for example, of approximately 1 to 3 kN) is applied to the rear mounting section 300. In a normal time during travel of the vehicle 10 and the like, due to an upward thrust from a road surface or inertia applied to the fuel cell module 100, the rear mounting section 300 is repeatedly pulled in the up-down direction or compressed in the up-down direction by the suspension member 160 and the support frame 130. In the case where the downward load is applied to the rear mounting section 300, similar to the time of the frontal collision described above, the first attachment section 321 of the rear bracket 320 is bent in such a manner as to protrude upward in FIG. 7. As a result, the tensile stress is applied to the upper surface of the first attachment section 321, and the compressive stress is applied to the lower surface of the first attachment section 321. On the contrary, in the case where the upward load is applied to the rear mounting section 300, opposite to the modification at the time of the frontal collision as described above, the first attachment section 321 of the rear bracket 320 is bent in such a manner as to protrude downward in FIG. 8. As a result, the compressive stress is applied to the upper surface of the first attachment section 321, and the tensile stress is applied to the lower surface of the first attachment section 321. On the upper surface of the first attachment section 321, the chill layer removed section 325 having the lower tensile strength and the lower fatigue strength than the chill layer is provided. On the lower surface of the first attachment section 321, the chill layer is provided. Accordingly, compared to a case where the chill layer removed section 325 is provided on both of the surfaces of the first attachment section 321, reductions in the tensile strength and the fatigue strength of the first attachment section 321 is suppressed. Thus, compared to the case where the chill layer removed section 325 is provided on both of the surfaces of the first attachment section 321, the rear bracket 320 in this embodiment is unlikely to be fractured by the vibration that is transmitted thereto in the normal time.

With the rear bracket 320 as the die-cast aluminum bracket for the vehicle according to this embodiment that has been described so far, the strength against the vibration, which is transmitted to the rear bracket 320 in the normal time, is secured by the chill layer, and the rear bracket 320 is likely to be fractured in the chill layer removed section 325 at the time when the large load is applied to the rear bracket 320 during the collision of the vehicle 10. Thus, an intended break mode in design can be realized. In particular, in this embodiment, the first attachment section 321 of the rear bracket 320 is fractured when the vehicle 10 is involved in the frontal collision. Accordingly, it is possible to suppress unlikeliness of the suspension member 160 between the front mounting section 200 and the rear mounting section 300 being crushed, which is caused when the support frame 130 strains. Therefore, it is possible to suppress inhibition of collision energy absorption using the deformation of the suspension member 160.

In this embodiment, when the upper surface of the first attachment section 321 and the opposite surface (the lower surface) to the upper surface of the first attachment section 321 are projected in the perpendicular direction to the upper surface of the first attachment section 321, the opposite surface (the lower surface) to the upper surface of the first attachment section 321 has the larger area of the chill layer than the upper surface of the first attachment section 321. Thus, when the large load is applied to the rear bracket 320 during the collision of the vehicle 10, the rear bracket 320 is likely to be fractured from the upper surface of the first attachment section 321 having the small area of the chill layer.

In this embodiment, the chill layer removed section 325 having the low tensile strength is provided around the first attachment holes 327 having the low rigidity. Thus, when the large load is applied to the rear bracket 320 during the collision of the vehicle 10, the first attachment section 321 is further likely to be fractured.

B. Another Embodiment 1

In the rear bracket 320 as the die-cast aluminum bracket for the vehicle according to the above-described embodiment, the chill layer removed section 325 is provided on the upper surface of the first attachment section 321. Meanwhile, in the die-cast aluminum bracket for the vehicle, the chill layer removed section 325 may be provided on a part of the opposite surface (the lower surface) to the upper surface of the first attachment section 321. Also, in such a case, while the strength against the vibration, which is transmitted to the rear bracket 320 in the normal time, is secured by the chill layer, the rear bracket 320 is likely to be fractured from the chill layer removed section 325 at the time when the large load is applied to the rear bracket 320 during the collision of the vehicle 10.

C. Another Embodiment 2

In the rear bracket 320 as the die-cast aluminum bracket for the vehicle according to the above-described embodiment, the chill layer removed section 325 is provided in the entire area of the upper surface of the first attachment section 321. Meanwhile, in the die-cast aluminum bracket for the vehicle, the chill layer removed section 325 may be provided on at least a part of the upper surface of the first attachment section 321 instead of the entire area of the upper surface of the first attachment section 321. Also, in such a case, the rear bracket 320 is likely to be fractured from the chill layer removed section 325 at the time when the large load is applied to the rear bracket 320 during the collision of the vehicle 10.

D. Another Embodiment 3

In the rear bracket 320 as the die-cast aluminum bracket for the vehicle according to the above-described embodiment, the chill layer removed section 325 is provided in such a manner as to surround the outer circumferences of the first attachment holes 327 on the upper surface of the first attachment section 321. Meanwhile, in the die-cast aluminum bracket for the vehicle, the chill layer removed section 325 may not be provided in such a manner as to surround the outer circumferences of the first attachment holes 327, and the chill layer removed section 325 only has to be provided on at least a part of the upper surface of the first attachment section 321. Also, in such a case, the rear bracket 320 is likely to be fractured from the chill layer removed section 325 at the time when the large load is applied to the rear bracket 320 during the collision of the vehicle 10.

E. Another Embodiment 4

In the rear bracket 320 as the die-cast aluminum bracket for the vehicle according to the above-described embodiment, the body section 323 is provided between the first attachment section 321 and the second attachment section 322. Meanwhile, in the die-cast aluminum bracket for the vehicle, the body section 323 may not be provided between the first attachment section 321 and the second attachment section 322, and the first attachment section 321 and the second attachment section 322 may directly be connected to each other.

F. Another Embodiment 5

The rear bracket 320 as the die-cast aluminum bracket for the vehicle according to the above-described embodiment has the first rib 324a, the second rib 324b, and the third rib 324c. Meanwhile, the die-cast aluminum bracket for the vehicle may not have the first rib 324a, the second rib 324b, and the third rib 324c.

The technical characteristics in this embodiment can appropriately be replaced or combined. The technical characteristics in this embodiment can also be eliminated appropriately.

What is claimed is:

1. A die-cast aluminum bracket for a vehicle provided between a mounted object and a vehicle structure, the die-cast aluminum bracket comprising:

a first attachment section configured to be coupled to the mounted object; and a second attachment section configured to be coupled to the vehicle structure, wherein a first surface, which faces the mounted object at the time when the mounted object is coupled, in the first attachment section has a chill layer removed section in which an internal layer of the bracket is exposed, and a second surface of the first attachment section has a chill layer, the second surface being on an opposite side of the first attachment section from the first surface;

wherein the chill layer is an external surface of the die-cast aluminum bracket formed by a mold, and the chill layer removed section is a portion of the die-cast aluminum bracket with an external surface of the chill layer removed to expose an inner layer of the bracket.

2. The die-cast aluminum bracket according to claim 1, wherein the first surface has an area of the chill layer; and an area of the chill layer on the second surface is larger than the area of the chill layer on the first surface.

3. The die-cast aluminum bracket according to claim 1, wherein the first surface has an area of the chill layer; and when the first surface and the second surface are seen in a direction perpendicular to the first surface, an area of the chill layer on the second surface is larger than the area of the chill layer on the first surface.

4. The die-cast aluminum bracket according to claim 1, wherein an attachment hole is provided in the first attachment section, the attachment hole being configured to be fitted with a bolt coupling the mounted object and the first surface, and the chill layer removed section surrounds an outer circumference of the attachment hole.

* * * * *

UNITED STATES PATENT AND TRADEMARK OFFICE
CERTIFICATE OF CORRECTION

| | | |
|---|---|---|
| PATENT NO. | : 11,014,458 B2 | Page 1 of 1 |
| APPLICATION NO. | : 16/456144 | |
| DATED | : May 25, 2021 | |
| INVENTOR(S) | : Shigetaka Yoshikawa et al. | |

It is certified that error appears in the above-identified patent and that said Letters Patent is hereby corrected as shown below:

On the Title Page

Item (73), should read:
(73) Assignees: TOYOTA JIDOSHA KABUSHIKI KAISHA, Toyota (JP)
CHUO MALLEABLE IRON CO., LTD., Nagoya (JP)

Signed and Sealed this
Third Day of May, 2022

*Katherine Kelly Vidal*

Katherine Kelly Vidal
*Director of the United States Patent and Trademark Office*